UNITED STATES PATENT OFFICE.

ERASTUS FAIRBANKS AND THADDEUS FAIRBANKS, OF ST. JOHNSBURY, VERMONT.

MODE OF CONSTRUCTING STEELYARD-BALANCES.

Specification forming part of Letters Patent No. 120, dated September 22, 1832; Reissued February 10, 1837.

*To all whom it may concern:*

Be it known that we, ERASTUS FAIRBANKS and THADDEUS FAIRBANKS, of St. Johnsbury, Caledonia county, and State of Vermont, have invented a new and Improved Method of Constructing and of Weighing by Means of Steelyard-Balances, and that the following is a full and exact description of our said improvement.

The main object had in view by us, was to adapt the balance more perfectly than has heretofore been done to those machines which are constructed for the purpose of weighing loaded wagons and other articles of great weight. But our improved balance is also applied to such ordinary weighing as is effected by means of instruments constructed on the principle of what is called Dearborn's patent balance, when the same is used for ponderous articles.

We construct a balance in the general form above indicated, dividing the arm of the balance by notches for using a movable poise indicating any number of pounds, from one to one hundred, or from one to one thousand. In combination with the movable poise we use graduated weights suspended from the end of the balance indicating even hundreds or thousands of pounds. For the double purpose of obtaining an exact counter-poise to the platform, and of obtaining an equilibration of the beam itself, we affix to the beam a cylindrical or other formed weight, to be moved horizontally on a line elevated above the edge of the pivot by which the balance is suspended, and which forms the axis of its motion.

It is a principle well understood in the construction of the Dearborn balance, that the center of its gravity when suspended, must be very little below the edge of the sustaining pivot—that too great an amount of material above the horizontal range of that edge will occasion the beam to rise or fall indefinitely, while too great a weight of material below such horizontal range tends to settle the beam into an unyielding horizontal position, and to render it unsusceptible to the weight applied. The elevated position of the movable weight above described affords an opportunity, by selecting one of proper gravity to correct any defect in the operation of the balance, and to facilitate and perfect its equilibrium. Our usual method is to attach one end of a screw rod to a standard rising from the end of the beam; which screw rod extends along in the direction of the beam toward its fulcrum. Its inner end we usually turn down and curve, so that it may be fastened on one side of the beam, thus removing it out of the way of the hook of the movable poise. A cylindrical weight or ball is drilled through its center and tapped with a female screw, fitting and placed upon the screw rod. This it will be seen furnishes the means of regulating the balance with the utmost precision, and also of counteracting any variation in the weight of the platform. The rod and its weight stand a sufficient height above the beam to secure a horizontal equilibrium, and to allow the hook of the poise to pass under them. It is obvious to remark that the same effect may be produced by placing the weight at the other end of the beam at an equal elevation above the edge of the sustaining pivot. Or the beam may be so constructed as to place the weight on a horizontal line, below the edge of the sustaining pivot with the same effect.

We do not claim the movable weight attached to the beam, for the purpose simply of obtaining an exact counterpoise to the platform as heretofore used; but we do claim it in the positions above described, for the double purpose of obtaining an exact counterpoise to the platform, and of putting the beam into equilibrium.

ERASTUS FAIRBANKS.
THADDEUS FAIRBANKS.

Witnesses:
LUTHER JEUETT,
HIRAM KNAPP.

[FIRST PRINTED 1914.]